United States Patent
Takeda et al.

(10) Patent No.: US 6,566,011 B1
(45) Date of Patent: May 20, 2003

(54) LITHIUM SECONDARY BATTERY

(75) Inventors: Yasuo Takeda, Tsu (JP); Yang Jun, Tsu (JP)

(73) Assignees: Toyota Jidosha Kabushiki Kaisha, Toyota (JP); Genesis Research Institute, Inc., Nagoya (JP)

( * ) Notice: Subject to any disclaimer, the term of this patent is extended or adjusted under 35 U.S.C. 154(b) by 83 days.

(21) Appl. No.: 09/630,434

(22) Filed: Aug. 1, 2000

(30) Foreign Application Priority Data

Aug. 4, 1999 (JP) ............................................ 11-221277

(51) Int. Cl.$^7$ .............................. H01M 4/58; H01M 4/40
(52) U.S. Cl. ................................. 429/231.1; 429/218.1; 429/231.3
(58) Field of Search ........................... 429/218.1, 231.1, 429/232, 231.3

(56) References Cited

FOREIGN PATENT DOCUMENTS

JP          10302776 A    * 11/1998   ............ H01M/4/02

OTHER PUBLICATIONS

Nishijima et al., "Synthesis and electrochemical studies of a new anode material, Li3–xCoxN", Solid State Ionics, 83 (Jan., 1996) pp. 107–111.*

* cited by examiner

*Primary Examiner*—Carol Chaney
(74) *Attorney, Agent, or Firm*—Burns, Doane, Swecker & Mathis, LLP

(57) ABSTRACT

A lithium secondary battery includes a negative electrode active material. The negative electrode active material includes a primary active material and a secondary active material. The primary active material is at least one member selected from the group consisting of carbonaceous materials, Sn, Sn alloys, Sn oxides, Al, Al alloys, Pb, Pb alloys, Si and Si oxides. The secondary active material includes a lithium nitride expressed by a composition formula, $Li_{3-x}M_xN$, in which "M" is at least one element selected from the group consisting of transition metals and "x" is $0<$"x"$\leq 0.7$. In the lithium secondary battery, the negative electrode retention is relieved efficiently, the capacity is less likely to change suddenly, and the wasting of a positive electrode material is less.

16 Claims, 7 Drawing Sheets

Mixing Ratio of Composite Active Material in Ex. #1
$SnSb_{0.14} : Li_{2.6}Co_{0.4}N = 75:25$ (Weight Ratio)

Mixing Ratio of Composite Active Material in Ex. #1
$SnSb_{0.14}:Li_{2.6}Co_{0.4}N=75:25$ (Weight Ratio)

E. #1: $SnSb_{0.14}$(75wt%)+$Li_{2.6}Co_{0.4}N$(25wt%)
C. E. #1: $SnSb_{0.14}$

LITHIUM SECONDARY BATTERY

BACKGROUND OF THE INVENTION

1. Field of the Invention

The present invention relates to a lithium secondary battery, which utilizes the inserting-and-extracting phenomenon of lithium ions. More particularly, it relates to an improvement on its negative electrode.

2. Description of the Related Art

Since the lithium secondary battery exhibits a high energy density, it has been put into practical application and has been available in the field of communication or information devices as cellular phones, personal computers, and video cameras, etc., are down-sized. Moreover, it is considered to apply it in the other usages, for example, a power source for an electric vehicle and an electricity storing system, etc.

Now, the main stream of the lithium secondary battery is a so-called locking-chair type lithium secondary battery, which uses a carbonaceous material as the negative electrode. In the lithium secondary battery using a carbonaceous material as the negative electrode active material accompanies a problem, so-called the retention problem, in that the lithium inserted in the negative electrode by the initial charging is trapped in the negative electrode, is not discharged in the discharging thereafter, and remains as the irreversible capacity.

The retention of the negative electrode not only results in the sudden capacity variation in the secondary battery, but also in the wasting of the positive electrode active material, because it is necessary to arrange the lithium secondary battery so that the facing positive electrode involves lithium in an excessive amount, which is equivalent to the irreversible capacity, in order not to decrease the capacity of the secondary battery. Hence, in the case of the lithium secondary battery, it is desired to elaborate a certain means for relieving the retention of the negative electrode efficiently.

The carbonaceous material exhibits a theoretical capacity of from 350 to 400 mAh/g even if it is said to exhibit a large capacity. In order to increase the capacity of the lithium secondary battery, it is needed to urgently select a large capacity negative electrode active material. Some of the large size negative electrode active materials, being in the limelight, are Al, Sn, Pb and their alloys. In particular, an Sn—Sb base alloy is said to exhibit an ideal capacity, which exceeds 1,000 mAh/g.

However, the problem of the negative electrode retention is not only associated with the carbonaceous materials, but also with the other active materials. For example, the aforementioned Sn—Sb base alloy only produces an effective capacity of from 550 to 600 mAh/g approximately, in contrast with the nominal theoretical capacity exceeding 1,000 mAh/g. Thus, there also exists a large irreversible capacity.

On the other hand, as disclosed in Japanese Unexamined Patent Publication (KOKAI) No. 11-3,707 and Japanese Unexamined Patent Publication (KOKAI) No. 9-298,068, trials are made to use a lithium nitride expressed by a composition formula, $Li_{3-x}M_xN$, in which a transition element "M" substitutes for a part of the Li. In this $Li_{3-x}M_xN$, since it is already composed of lithium, no retention is present. However, in the lithium secondary battery, since $LiCoO_2$, etc., is used generally as a pairing positive electrode active material, the composing lithium should be extracted, for example, by an electrochemical means in advance from $Li_{3-x}M_xN$. Accordingly, it is necessary to carry out the lithium extracting process. Hence, it is one of the causes that $Li_{3-x}M_xN$ is inhibited from using as a negative electrode active material and accordingly from putting it into actual applications.

SUMMARY OF THE INVENTION

The inventors of the present invention thought of actively utilizing the aforementioned characteristic of $Li_{3-x}M_xN$ that $Li_{3-x}M_xN$ includes lithium, and discovered that the lithium involved in $Li_{3-x}M_xN$ can be stored in the other negative electrode active material by compositing $Li_{3-x}M_xN$ with the other negative electrode active material. The present invention is developed based on the discovery. It is an object of the present invention to provide a lithium secondary battery, whose negative electrode retention is relieved efficiently, which is free from the abrupt capacity variation, and which wastes the positive electrode active material less, by compositing two or more negative electrode active materials so as to compensate the disadvantages with each other.

It is the other object of the present invention to provide a lithium secondary battery, which has a larger capacity while relieving the negative electrode retention, by selecting the other negative electrode active materials to be composited.

A lithium secondary battery according to the present invention is characterized in that a negative electrode active material comprises: at least one primary active material selected from the group consisting of carbonaceous materials, Sn, Sn alloys, Sn oxides, Al, Al alloys, Pb, Pb alloys, Si and Si oxides; and a secondary active material comprising a lithium nitride expressed by a composition formula, $Li_{3-x}M_xN$, in which "M" is at least one element selected from the group consisting of transition metals and "x" is $0<"x"\leq0.7$. Namely, the present invention is a secondary lithium battery, in which two kinds of active materials, the primary active material and the secondary active material, are composited or, in other words, are mixed to use as a negative electrode active material.

The materials listed as the primary active material are all active materials, in which the capacity difference exists between the initial charging capacity and the discharging capacity thereafter, and which take in a large amount of lithium as the irreversible capacity. On the other hand, since the secondary active material, $Li_{3-x}M_xN$, includes Li in advance, there does not exist the irreversible capacity theoretically. However, they are active materials which do not produce a large capacity unless Li is extracted in advance.

When the negative electrode is constituted by mixing the two kinds of the active materials, and when it is contacted with an electrolyte, Li extracts from $Li_{3-x}M_xN$ of itself (without adding extra energy), and is inserted in the primary active material. As a result, the primary active material is filled with Li in an amount equivalent to the irreversible capacity, and becomes an active material which is free from the retention. Simultaneously, the secondary active material, from which Li extracts, becomes an active material of a large capacity. Thus, by the simple means, such as by simply compositing the active materials so as to constitute the negative electrode, it is possible to make a secondary battery according to the present invention having a favorable characteristics, secondary battery from which the negative retention is relieved efficiently, which has a large capacity, and which is free from the abrupt capacity variation. Even if the present battery has the same capacity as that of a conventional battery, the present lithium secondary battery does not require a positive active material in an excessive amount. Thus, the present lithium secondary battery is good in terms of cost as well.

In the lithium secondary battery according to the present invention, it is possible to select the primary active material from the listed substances, and to also select at least one member from the group consisting of Sn, Sn alloys and Sn oxides. Namely, the Sn base substances can be used as the primary active material.

These Sn base substances insert Li therein to make Li alloys so that they make active materials having an extremely large capacity. By thus selecting the Sn base substances as the primary active material, the present lithium secondary battery becomes a secondary battery, which has an extremely large capacity (or a large capacity density).

The lithium secondary battery according to the present invention is constituted so that the composite active material, which is made by compositing the primary active material and the secondary active material, is used as the negative electrode active material. The primary active material can include carbonaceous materials, Sn base substances, etc., and the secondary active material can include lithium nitrides a part of whose lithium sites are replaced by a transition metal. With this arrangement, it is possible to insert Li in the primary active material, due to the voltage difference, Li which is present in the secondary active material in advance. Thus, the present secondary battery makes a secondary battery, in which the retention occurred in the negative electrode is relieved efficiently. Moreover, it is possible to make a lithium secondary battery having a lager capacity by using Sn base substances as the secondary active material.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms part of the disclosure.

DETAILED DESCRIPTION OF THE PREFERRED EMBODIMENTS

Figure 1:
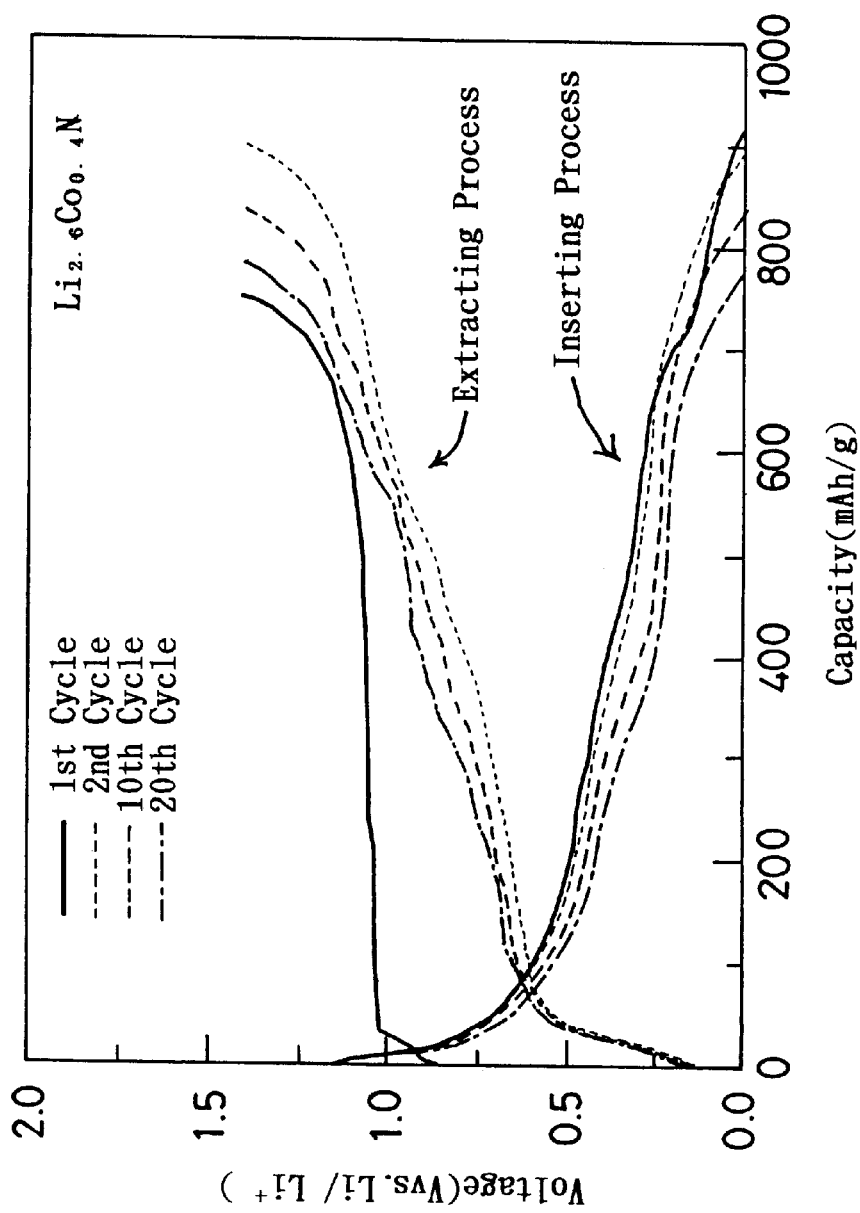
FIG. 1 illustrates the charge-discharge characteristic curves which were exhibited by $Li_{2.6}Co_{0.4}N$.

Having generally described the present invention, a further understanding can be obtained by reference to the specific preferred embodiments which are provided herein for the purpose of illustration only and are not intended to limit the scope of the appended claims.

<Primary Active Material>

In the lithium secondary battery according to the present invention, the primary active material included as the negative electrode active material can be at least one member selected from the group consisting of carbonaceous materials, Sn, Sn alloys, Sn oxides, Al, Al alloys, Pb, Pb alloys, Si and Si oxides. In the present secondary battery, the primary active material mainly becomes a negative electrode active material, and can be a member selected independently from the aforementioned substances. Alternatively, it is possible to select two or more of them so as to mix them.

A representative usable member is carbonaceous materials. The carbonaceous materials are now used mostly in lithium secondary batteries. As the usable carbonaceous materials, it is possible to exemplify natural graphite, sphere-shaped or fiber-shaped artificial graphite, carbon which is difficult to turn into graphite, and carbon, such as cokes, burned organic compounds, etc., like phenol resins, which is easy to turn into graphite. These carbonaceous materials have advantages, respectively, and can be selected in accordance with the characteristics of lithium secondary batteries to prepare. Note that it is possible to use one of the carbonaceous materials independently, or it is possible to use two or more of them so as to mix them.

Other than the carbonaceous materials, it is possible to list Sn, Sn alloys, Sn oxides, Al, Al alloys, Pb, Pb alloys, Si or Si oxides as a material to be used as the primary active material. These Sn base substances, Al base substances, Pb base substances and Si base substances are active materials which have a relatively large capacity. These substances insert Li therein, and are turned into alloys or compounds with the Li. Thus, these substances are put into a state in which they insert and extract Li reversibly. However, in the process reaching the reversible state, there is Li, which is taken in into the substances in a relatively large amount, and which does not extract thereafter, in an amount equivalent to the irreversible capacity. Accordingly, the composite effect with secondary active material, which will be described later in detail, is enhanced.

These Sn base substances, Al base substances, Pb base substance and Si base substances are used as the active material in a powdered manner. Conventionally, it has been worried that the volume expansion and contraction, which result from the inserting and extracting Li, deteriorates the cycle characteristics of secondary batteries greatly. Hence, in the case of using these substances, it is possible to improve the cycle characteristics by reducing the particle size in the powders. It is preferable to use a powder having a particle diameter of from 0.1 to 5 μm as the active material.

Sn base substances will be described later in detail. As for the usable Al alloys, it is possible to list Al—Mn alloys, Al—Cu alloys, etc. As for the Pb alloys, it is possible to list Pb—Cd alloys, Pb—Sn alloys, etc. As for the Si oxides, it is possible to list SiO, etc.

Among the Sn base substances, Al base substances, Pb base substances and Si base substances, it is preferable to use at least one member selected from the group consisting of Sn, Sn alloys and Sn oxides as the primary active material, because they can further enlarge the capacity. As for the usable Sn alloys, it is possible to list Sn—Sb alloys, Sn—Bi alloys, Sn—Pb alloys. As for the Sn oxides, it is possible to list $SnO_2$, SnO., etc.

Further, in the case of using the Sn alloys, it is preferable to use the Sn alloys which are expressed by a composition formula $SnSb_y$. The reason is as follows. When Sb is added to Sn, the improvement of the cycle characteristics is observed in the inserting and extracting Li. In this case, an alloying composition ratio in $SnSb_y$: namely; the value "y" in the composition formula can preferably be 0.1≦"y"≦0.35. When "y"<0.1, the cycle characteristics are poor slightly in the inserting and extracting of Li. When "y">0.35, there is a possibility that the potential voltage (vs. Li/Li$^+$) increases so that the voltage of the resulting battery cannot be an appropriate value when the Sn alloys are used as a negative electrode.

The process for producing the primary active materials is not limited in particular, and it is possible to produce it by any known process in general. For example, when an Sn—Sb alloy, expressed by the composition formula $SnSb_y$, is produced, the process can be carried out in the following manner: an adaptable chloride is dissolved into water; and an aqueous solution containing an appropriate reducing agent (e.g., $NaBH_4$) is added thereto, thereby reducing the chloride to a metal. Thereafter, the particle size can be adjusted by aging in the solution, or by heat treating at a temperature of a couple of hundreds ° C.

<Secondary Active Material>

In the lithium secondary battery according to the present invention, the second active material involved as the negative electrode active material can be a lithium nitride expressed by a composition formula, $Li_{3-x}M_xN$, in which "M" is at least one element selected from the group consisting of transition metals and "x" is 0<"x"≦0.7. The transition metal atoms substitute for a part of the lithium atoms which are at the sites of $Li_3N$, and Li extracting from the lithium nitride is inserted in the aforementioned primary active material. Thus, the secondary active material plays a so-called compensating role so as to relieve the retention of the primary active material. Moreover, the secondary active material becomes a negative electrode active material, which has a high Li inserting ability, namely, a large capacity, by extracting Li. Depending on the kinds of the transition elements "M" and the substitution ratios, it is possible to use a variety of lithium nitrides. It is possible to independently select one of them as the secondary active material, or to select and mix two or more of them as the secondary active material.

The transition metal "M" can be selected from the transition metals. It is possible to substitute one element of them for a part of the lithium sites, or to substitute two or more elements of them for a part of the lithium sites. Among the transition metals, the transition metal "M" can be at least one element selected from the group consisting of Co, Ni and Cu, because they are likely to synthesize the structure of $Li_3N$. Further, considering an advantage, e.g., a large Li insertion-and-extraction amount, it is further preferable to select Co.

The substitution rate of the transition metal "M", namely, the value "x" in the composition formula can be 0<"x"≦0.7. The reason is as follows. When "x">0.7, the substitution cannot be carried out by "M", and "M" co-exists as an impurity so that the capacity decreases. Further, when Co is selected, the substitution rate can further preferably be 0.3≦"x"≦0.5. The reason is as follows. When the substitution rate with Co is "x"<0.3, the Li inserting-and-extracting amount is reduced. When "x">0.5, the reversibility of the Li insertion-and-extraction decreases.

When the aforementioned lithium nitride is used as the secondary active material, similarly to the primary active material, there exists an appropriate range for the grain size. Considering the mixing ability with the primary active material, and realizing that the particles contact with each other effectively, it is preferred that the secondary active material has a particle diameter substantially equal to that of the primary active material. With regard to the particle diameter of the lithium nitride, it is preferred that the lithium nitride has a particle diameter of from 0.1 to 5 μm.

The process for producing $Li_{3-x}M_xN$ is not limited in particular, and it is possible to produce it by any known process. An example of the process is as follows. When $Li_{3-x}Co_xN$ is produced, for example, it can be formed by the following process: $Li_3N$ and a metallic powder of Co are reacted in an $N_2$ gas flow at a temperature of from 600 to 800° C. for a couple of hours.

<Composition of Primary Active Material and Secondary Active Material>

In the lithium secondary battery according to the present invention, the primary active material and the secondary active material are composited, for instance, they are mixed, and they are used as a negative electrode active material. It is preferred that the mixing ratio can be a ratio which depends on the roles of the both of the active materials. In view of the facts that Li extracted from the secondary active material is inserted in the primary active material so that the retention of the primary active material is relieved and the capacity of the secondary active material is enlarged simultaneously, the mixing ratio can be determined accordingly.

For example, when $SnSb_x$ is used as the primary active material, and when $Li_{3-x}Co_xN$ is used as the secondary active material, the electrochemical reaction occurs as shown in the following equation.

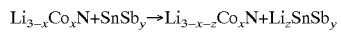

$$Li_{3-x}Co_xN + SnSb_y \rightarrow Li_{3-x-z}Co_xN + Li_zSnSb_y$$

Therefore, it is an ideal mixing ratio theoretically that a total amount of $Li_{3-x}Co_xN$ can be a minimum required amount thereof so that an amount of all Li inserted in $SnSb_y$ becomes an amount of Li equivalent to the irreversible capacity possessed by the entire $SnSb_y$ when an equilibrium voltage is reached. The mixing ratio depends on the kinds of the primary active material and the secondary active material. Their charge-discharge characteristics are examined, and the amount can be determined according to the results. For instance, when $SnSb_y$(0.1≦"y"≦0.35) is used as the primary active material, and when $Li_{3-x}Co_xN$ (0.3≦"x"≦0.5) is used, it is a practical mixing ratio that the ratio, $SnSb_y$: $Li_{3-x}Co_xN$, is from 80:20 to 60:40 by weight.

Both of the primary active material and the secondary active material are used in a form of powder. The mixing process of them is not limited in particular. For example, they can be mixed fully and uniformly to make a mixture powder by a ball mill, etc. Thereafter, the mixture powder can be supplied in a negative electrode forming process for producing an ordinary lithium secondary battery.

<Lithium Secondary Battery>

Except that the above-described negative electrode active material, the lithium secondary battery according to the present invention is not limited in the arrangements. The component members employed by the general lithium secondary batteries, such as the positive electrodes, the negative electrodes, the separators disposed between the positive electrodes and the negative electrodes, the non-water electrolytes and the battery cases, can be combined to make lithium secondary batteries, which depend on the purposes of lithium secondary batteries. An example how to arrange the present lithium secondary battery will be hereinafter described.

The negative electrode can be made as follows. The negative electrode active material includes the aforementioned primary active material and the aforementioned secondary active material. The negative electrode active material is mixed with a conduction assistant material, if necessary, and is bonded on a surface of a negative electricity collector by a bonding agent. The conduction assistant material is adapted for securing the electric conduction of the negative electrode by itself. Except that the carbonaceous materials are used as the primary active material, it is preferred that the conduction assistant material exists in the negative electrode. As for the conduction assistant material, it is possible to use a metallic Ni powder, carbonaceous powders, such as carbon black and acetylene black, etc. As for the bonding agent, it is possible to use fluorine-containing resins, such as polytetrafluoroethylene, polyvinylidene fluoride and fluororuber, and thermoplastic resins, such as polypropylene and polyethylene, etc. Further, as for solvents for the bonding agents (i.e., dispersing agent for active materials), it is possible to use organic solvents, such as N-methyl-2-pyrrolidone.

The negative electrode can be formed in the following manner. First, the negative electrode active material is mixed with the conduction assistant material and the bonding agent. Then, the solvent is added to the mixture in a proper amount, and is kneaded fully by a ball mill, etc., thereby preparing a paste-like negative electrode active material mixture. The resulting negative electrode active material mixture is coated on a surface of an electricity collector, which is made of an Ni foil, a Cu foil, etc., as a form of layer or film by a coating machine, etc. Thereafter, the negative electrode precursor is dried so that a sheet-shaped negative electrode is formed.

The positive electrode can be constituted by transition metal oxides containing lithium, the transition metal oxides which serve as positive electrode active materials. For instance, when $LiCoO_2$, $LiNiO_2$, $LiMn_2O_4$, etc., are assembled with the aforementioned negative electrode active material, they can make a positive electrode active material, from which a battery voltage of approximately 4 V is produced. The positive electrode can be formed in the following manner. The positive electrode active material is mixed with a conduction assistant material, and is coated on a surface of a positive electricity collector by a bonding agent. As for the conduction assistant material, it is possible to use carbonaceous powders, such as carbon black and acetylene black, etc. As for the bonding agent, similarly to the negative electrode, it is possible to use fluorine-containing resins, such as polytetrafluoroethylene, polyvinylidene fluoride and fluororubber, and thermoplastic resins, such as polypropylene and polyethylene. Further, as for solvents for the bonding agents, it is possible to use organic solvents, such as N-methyl-2-pyrrolidone.

The positive electrode can be formed in the following manner. Similarly to the negative electrode, first, the positive electrode active material is mixed with the conduction assistant material and the bonding agent, and the solvent is added in an appropriate amount. Then, the mixture is kneaded fully by a ball mill, etc., thereby preparing a paste-like positive electrode active material mixture. The resulting positive electrode active material mixture is coated on a surface of an electricity collector, which is made of an Al foil, etc., by a coating machine, etc. Thereafter, the positive electrode precursor is dried so that a sheet-shaped positive electrode is formed.

The separator disposed between the positive electrode and the negative electrode functions to separate the positive electrode and the negative electrode, and to hold a non-water electrolytic solution. As for the separator, it is possible to use a thin fine-porous sheet, such as polyethylene and polypropylene.

The non-water electrolytic solution dissolves a lithium salt, serving as the electrolyte, into an organic solvent. When the lithium salt is dissolved into the organic solvent, the lithium salt dissociates, and is turned into lithium ions, which are present in the electrolytic solution. As for the usable lithium salt, it is possible to list $LiBF_4$, $LiPF_6$, $LiClO_4$, $LiCF_3SO_3$, $LiAsF_6$, $LiN(CF_3SO_2)_2$, $LiN(C_2F_5SO_2)_2$, etc. It is possible to use one of these lithium salts independently, or to use two or more of them.

As for the organic solvent into which the lithium salt is dissolved, it is possible to use an aprotic solvent. For instance, it is possible to use a solution which includes one or more members selected from the group consisting of circular carbonate, linear carbonate, circular ester, circular ether and linear ether. The following can be listed as examples, respectively. As for an example of the circular carbonate, it is possible to list ethylene carbonate, propylene carbonate, butylene carbonate, vinylene carbonate, etc. As for an example of the linear carbonate, it is possible to list dimethyl carbonate, diethyl carbonate, methyl ethyl carbonate, etc. As for an example of the circular ester, it is possible to list γ-butyrolactone, γ-valerolactone, etc. As for an example of the circular ester, it is possible to list tetrahydrofuran, 2-methyl tetrahydrofuran, etc. As for an example of the circular ether, it is possible to list dimethoxyethane, ethylene glycol dimethyl ether, etc.

Instead of the aforementioned separator and the aprotic solvent, it is possible to use a solid polymer electrolyte (SPE), for example, a high molecular weight polymer, such as polyethylene oxide (PEO), etc. The polymer solid electrolyte can involve the lithium salt, such as $LiCF_3SO_3$, $LiN(CF_3SO_2)_2$, etc., in its matrix, and can be processed into a film shape.

The lithium secondary battery according to the present invention is constituted by the component members described so far. However, the shape can be varied variously, for example, a coin shape, a cylinder shape and a laminated shape. Even when one of the respective shapes is employed, the present lithium secondary battery can be completed in the following manner. The separator is disposed between the positive electrode and the negative electrode to make an electrode unit. An electricity collector lead connector, etc., connects between a positive electrode electricity collector and a positive terminal which penetrates to the outside from the positive electrode electricity collector, and connects between a negative electrode electricity collector and a negative terminal which penetrates to the outside from the negative electrode electricity collector. The aprotic electrolyte solution is impregnated into the electrode units. The electrode unit is enclosed in the battery case. Thus, the present lithium secondary battery is completed.

EXAMPLES

In order to verify the priority of the negative active material, which is one of the features of the lithium secondary battery according to the present invention, $SnSb_{0.14}$ or SnO was employed as the primary active material, and $Li_{2.6}Co_{0.4}N$ was used as the secondary active material. Then, the present lithium secondary battery was surveyed and evaluated for the charge-discharge characteristics. Note that, as the preconditions of the evaluation, $Li_{2.6}Co_{0.4}N$ and $SnSb_{0.14}$ were surveyed and evaluated for the charge-discharge characteristics independently and respectively. The examinations are hereinafter described as examples.

<Charge-Discharge Characteristics of $Li_{2.6}Co_{0.4}N$)

An electrode was prepared which included $Li_{2.6}Co_{0.4}N$ serving as the active material in an amount of 85% by weight, acetylene black serving as the conduction assistant material in an amount of 10% by weight, and polytetrafluoroethylene (PTFE) serving as the bonding agent in an amount of 5% by weight. Then, this electrode was disposed so as to assemble with a metallic Li electrode. Whilst, a mixture solvent was prepared which was made by mixing ethylene carbonate and dimethoxyethane in a ratio of 1:1 by volume, $LiPF_6$ was dissolved into the mixture solvent in a concentration of 1 M. An electrochemical cell was thus constituted. The electrochemical cell was charged and discharged repeatedly at room temperature at an electric current density of 0.5 $mA/cm^2$. FIG. 1 illustrates the charge-discharge characteristic curves of the $Li_{2.6}Co_{0.4}N$ under the aforementioned circumstances.

Note that, contrary to the lithium secondary battery according to the present invention, the $Li_{2.6}Co_{0.4}N$ was disposed on the positive electrode side in this electrochemical cell. Hence, this example is not referred to as a "secondary battery", but is referred to as the "electrochemical cell". Further, the discharging process, in which the Li was inserted in the $Li_{2.6}Co_{0.4}N$ in this electrochemical cell, is referred to as the "inserting process", and the charging process, in which the Li was extracted from the $Li_{2.6}Co_{0.4}N$ in this electrochemical cell, is referred to as the "extracting process". Unless otherwise stated, the notations are the same hereinafter. Furthermore, the capacity was a capacity with respect to a unit weight of the active material. Unless otherwise stated, the notation is the same hereinafter.

The $Li_{2.6}Co_{0.4}N$ already had an enough amount of the Li, and this charge-discharge cycle had started from the extracting process. Accordingly, it is understood from the charge-discharge characteristic curves of FIG. 1 that, at 1st cycle, the voltage of about 0.7 V with respect to the Li was increased to about 1.1 V in the early stage of the Li extraction. The Li was extracted in a capacity of about 700 mAh/g at the voltage. The portion where the voltage was constant is considered an intermediate region where the active materials were varied structurally and became amorphous. In the subsequent inserting process following thereafter, the Li was inserted in an amount equal to about 900 mAh/g while the voltage decreased gradually. At 2nd cycle or more, the same capacities of the charge-and-discharge were repeated in both of the inserting process and the extracting process while the voltage decreased gently in the range of from 0 to 1.4 V (average 0.7 V).

The capacity difference at the 1st cycle was about 200 mAh/g between the extracting process and the inserting process. Accordingly, when this $Li_{2.6}Co_{0.4}N$ was used as the negative electrode active material as it was, it is understood that the capacity of insertable Li was as less as approximately 200 mAh/g only. On the other hand, after the Li was once extracted from the $Li_{2.6}Co_{0.4}N$, it can be verified that the $Li_{2.6}Co_{0.4}N$ with the Li extracted could be a negative electrode active material exhibiting a capacity of about 900 mAh/g.

<Charge-Discharge Characteristics of $SnSb_{0.14}$>

Figure 2:
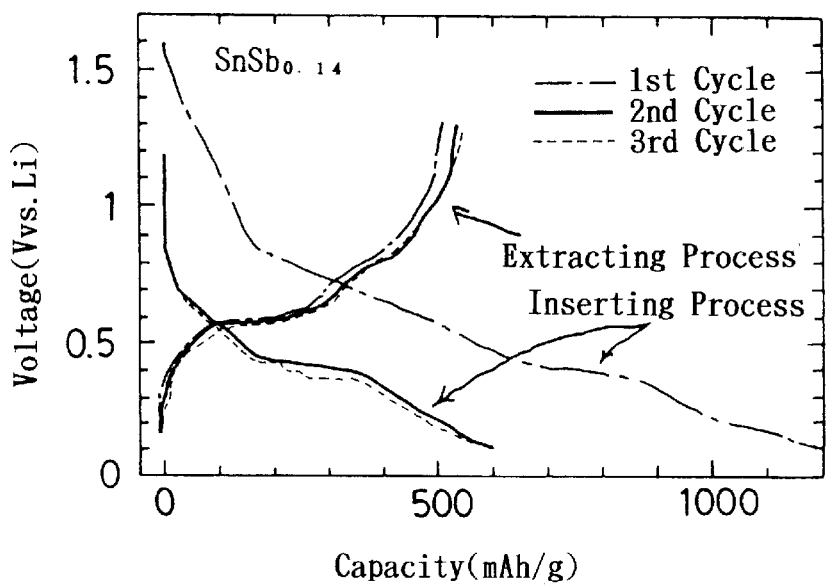
FIG. 2 illustrates the charge-discharge characteristic curves which were exhibited by $SnSb_{0.14}$.

An electrode was prepared which included $SnSb_{0.14}$ serving as the active material in an amount of 76% by weight, an Ni powder serving as the conduction assistant material in an amount of 12% by weight, and polyethylene oxide (PEO) and polyethylene (PE) serving as the bonding agent in an amount of 7% by weight, respectively. Then, this electrode was disposed so as to assemble with a metallic Li electrode. Whilst, $LiCF_3SO_3$ was involved in the matrix of the PEO in a concentration of 20% by weight, thereby constituting an electrochemical cell using a solid electrolyte. The electrochemical cell was charged and discharged repeatedly at a temperature of 80° C. at an electric current density of 0.1 $mA/cm^2$. FIG. 2 illustrates the charge-discharge characteristic curves of the $SnSb_{0.14}$ under the aforementioned circumstances.

Since this charge-discharge cycle was started from the inserting process, it is apparent from FIG. 2 that the electrochemical cell exhibited a large capacity exceeding 1,000 mAh/g at 1 cycle on the inserting process. On the other hand, at 2 cycles or more, the electrochemical cell exhibited a capacity of approximately 600 mAh/g on both of the extracting process and the inserting process. Thus, it is confirmed that the $SnSb_{0.14}$ was an active material which had a large irreversible capacity.

When comparing the charge-discharge characteristic curve of the $Li_{2.6}Co_{0.4}N$ at 1st cycle on the extracting process shown in FIG. 1 with the charge-discharge characteristic curve of the $SnSb_{0.14}$ at 1st cycle on the extracting process shown in FIG. 2, there arose the voltage difference of about 0.3 V on the average between both of them. Thus, it is verified that, due to the voltage difference existing between them, the Li contained in the $Li_{2.6}Co_{0.4}N$ was inserted in the $SnSb_{0.14}$ by compositing the $Li_{2.6}Co_{0.4}N$ and the $SnSb_{0.14}$ and contacting them with the electrolytes.

<Example No. 1>

75 parts by weight of $SnSb_{0.14}$ serving as the primary active material, and 25 parts by weight of $Li_{2.6}CO_{0.4}N$ serving as the secondary active material were mixed to make a composite active material. An electrode was prepared by compounding this composite active material in an amount of 80% by weight, an Ni powder serving as the conduction assistant material in an amount of 10% by weight, and polyethylene serving as the bonding agent in an amount of 10% by weight. Then, this electrode was disposed so as to pair with a metallic Li electrode. Whilst, as an aprotic solvent, ethylene carbonate and dimethoxyethane were mixed in a ratio of 1:1 by volume, and $LiPF_6$ was dissolved into the mixture solvent in a concentration of 1 M. An electrochemical cell was thus constituted This electrochemical cell was labeled as an electrochemical cell of Example No. 1.

The electrochemical cell of Example No. 1 was saved at room temperature for 10 hours. Due to the voltage difference between $Li_{2.6}Co_{0.4}N$ and $SnSb_{0.14}$, the Li contained in the $Li_{2.6}Co_{0.4}N$ was inserted in the $SnSb_{0.14}$. This electrochemical cell was subjected to a charge-discharge cycle test, in which the electrochemical cell was charged and discharged repeatedly at an electric current density of 0.5 mA/cm$^2$, at room temperature and in a voltage difference of from 0.1 to 1.3V. Note that the charge-discharge cycle test was started from the inserting process. Unless otherwise specified, the test was hereinafter carried out similarly.

In order to compare with the electrochemical cell of Example No. 1, an electrochemical cell of Comparative Example No. 1 was prepared. In the electrochemical cell of Comparative Example No. 1, an electrode was used in which only the $SnSb_{0.14}$ was served as the active material. Further, an electrochemical cell of Comparative Example No. 2 was prepared. In the electrochemical cell of Comparative Example No. 2, an electrode was used in which only the $Li_{2.6}Co_{0.4}N$ was used as the active material. These electrochemical cells of comparative examples were subjected to the test similarly. Note that, except the active materials, the arrangements of the electrodes, the arrangements of the electrochemical cells and the conditions of the charge-discharge cycle test were the same as those of Example No. 1.

Figure 3:
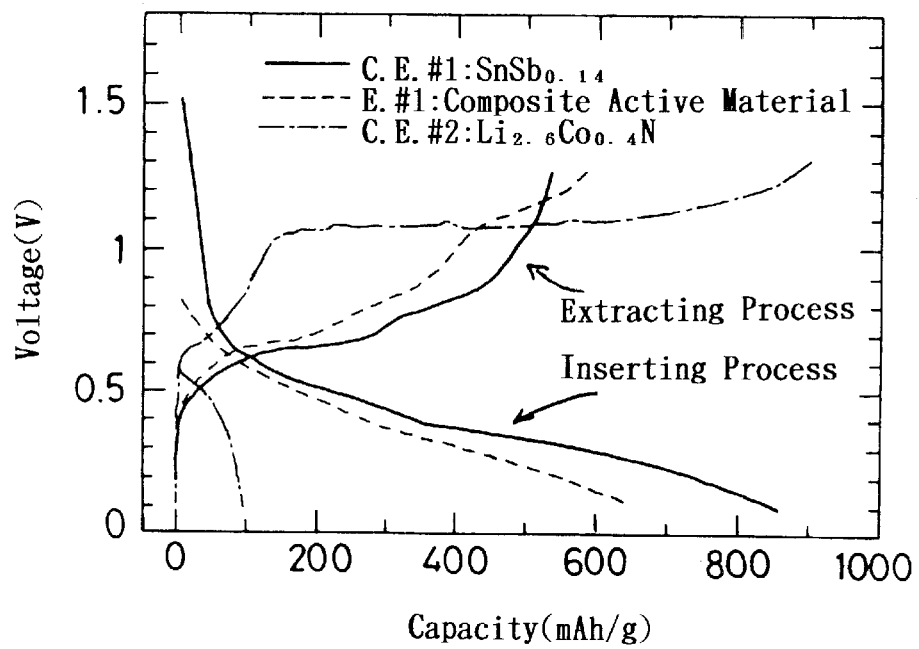
FIG. 3 illustrates the charge-discharge characteristic curves which were exhibited by the respective electrochemical cells of Example No. 1, Comparative Example No. 1 and Comparative Example No. 2 at 1st cycle.
Figure 4:
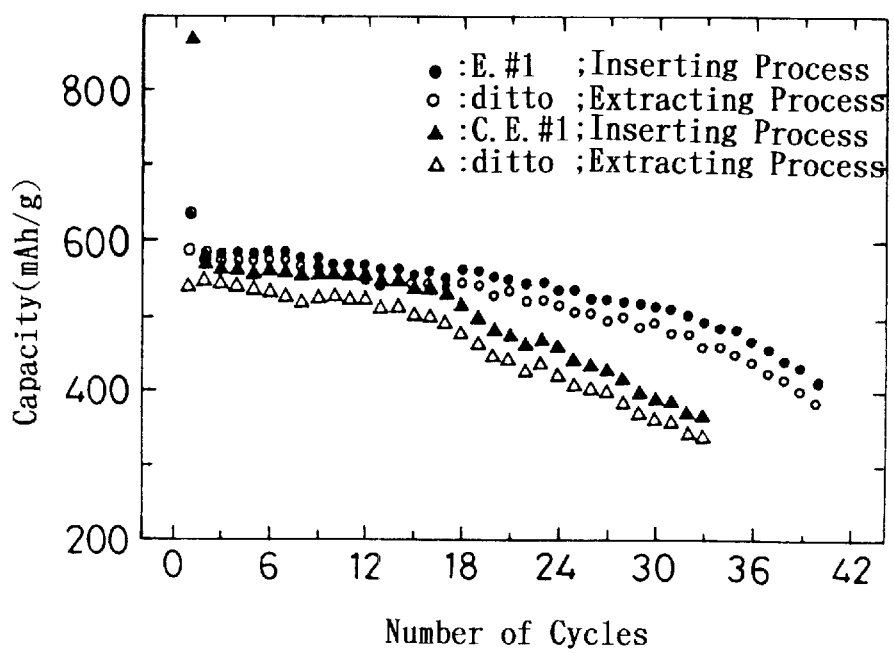
FIG. 4 illustrates the capacities on the inserting process and the capacities on the extracting process which were exhibited by the respective electrochemical cells of Example No. 1 and Comparative Example No. 1 at respective cycles.
Figure 5:
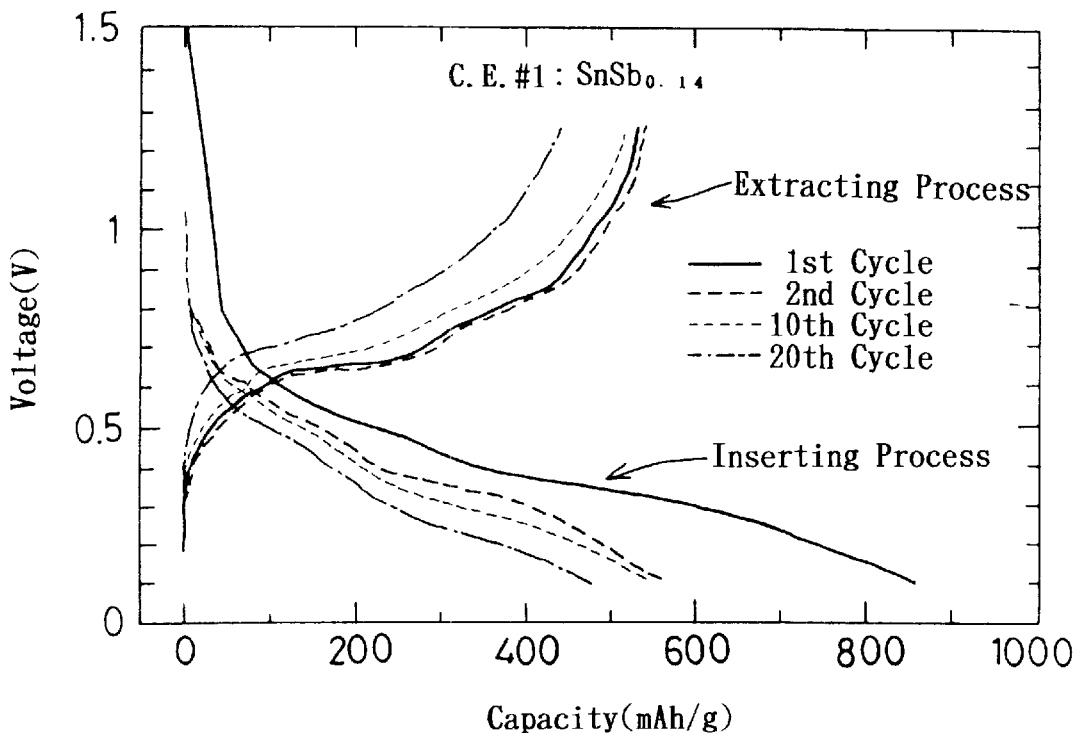
FIG. 5 illustrates the charge-discharge characteristic curves which were exhibited by the electrochemical cell of Comparative Example No. 1 at 1st, 2nd, 10th and 20th cycles.
Figure 6:
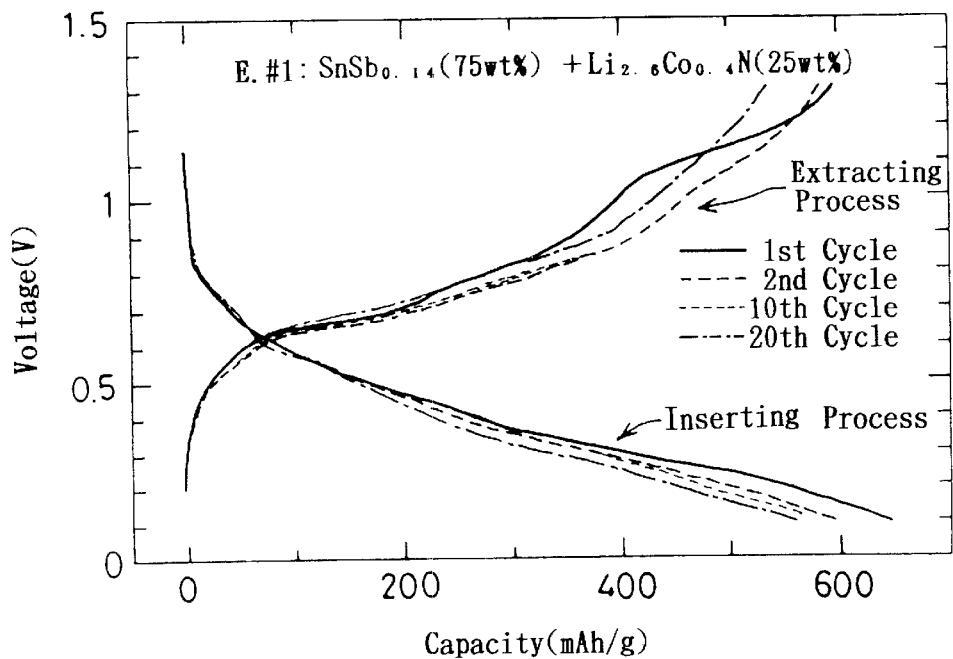
FIG. 6 illustrates the charge-discharge characteristic curves which were exhibited by the electrochemical cell of Example No. 1 at 1st, 2nd, 10th and 20th cycles.

FIGS. 3 through 6 show the following, respectively. FIG. 3 illustrates the charge-discharge characteristic curves, which were exhibited by the respective electrochemical cells of Example No. 1, Comparative Example No. 1 and Comparative Example No. 2 at 1st cycle. FIG. 4 illustrates the capacities in the inserting process and the capacities in the extracting process, which were exhibited by the electrochemical cells of Example No. 1 and Comparative Example No. 1 at the respective cycles. FIG. 5 illustrates the charge-discharge characteristic curves which were exhibited by the electrochemical cell of Comparative Example No. 1 at 1st, 2nd, 10th and 20th cycles. FIG. 6 illustrates the charge-discharge characteristic curves which were exhibited by the electrochemical cell of Example No. 1 at 1st, 2nd, 10th and 20th cycles.

In FIG. 3, the electrochemical cell of Comparative Example No. 1, which employed the electrode composed of $SnSb_{0.14}$ only, there was a difference between the inserting-process capacity and the extracting-process capacity at 1st cycle. Accordingly, it is understood that an irreversible capacity existed in the electrode. On the other hand, in the electrochemical cell of Example No. 1, which employed the electrode using the composite active material, the following advantages were verified: namely; there was substantially no difference between the inserting-process capacity and the extracting-process capacity; the Li of the $Li_{2.6}Co_{0.4}N$ constituting the composite active material was inserted in the $SnSb_{0.14}$; and the irreversible capacity, which should have been existed in the $SnSb_{0.14}$ was reduced remarkably. These can be similarly confirmed by FIG. 4, and by comparing FIG. 5 with FIG. 6.

In FIG. 3, it is also justified that, in the case of the electrochemical cell of Comparative Example No. 2 which employed the electrode using only the $Li_{2.6}Co_{0.4}N$ as the active material, the inserting-process capacity, which started from the Li inserting, was remarkably small on the inserting process at the 1st cycle. Thus, it is verified that it is impossible to obtain a large capacity without extracting the Li in advance.

FIG. 4 compares the capacities, which were exhibited by the electrochemical cells of Example No. 1 and Comparative Example No. 1 at the respective cycles. According to FIG. 4, the electrochemical cell of Example No. 1, which had the electrode using the composite active material, the capacity diminished less as cycle elapsed than the electrochemical cell of Comparative Example No. 1. Thus, it is understood that Example No. 1 had the electrode, which was better than that of Comparative Example No. 1 in terms of the cyclic characteristic. It is believed that this favorable cyclic characteristic is effected as follows: namely; the both of the active materials are kept to contact with each other to inhibit the coming-off, etc., resulting from the volumetric variation, which are observed when the $SnSb_{0.14}$ is used independently, and which accompanies the inserting-and-extracting of the Li. Hence, it was confirmed that the lithium secondary battery according to the present invention, in which the composite active material was used as the negative electrode active material, was favorable in terms of the cyclic characteristic.

<Example No. 2>

This example was an example, which used an electrode whose arrangements were different from those of Example No. 1. 75 parts by weight of $SnSb_{0.14}$ serving as the primary active material, and 25 parts by weight of $Li_{2.6}Co_{0.4}N$ serving as the secondary active material were mixed to prepare a composite active material. Regarding this composite active material, it is the same as that of Example No. 1. 83% by weight of this composite active material, 5% by weight of an acetylene black serving as the conduction assistant material, and 10% by weight of polyethylene serving as the bonding agent were compounded to prepare an electrode. Then, an electrochemical cell was prepared by using the electrode in the same manner as Example No. 1, and was labeled as an electrochemical cell of Example No. 2.

In order to compare with the electrochemical cell of Example No. 2, an electrochemical cell of Comparative Example No. 3 was prepared. In the electrochemical cell of Comparative Example No. 3, an electrode was used in which only the $SnSb_{0.14}$ was served as the active material. Except the active material, the arrangements of the electrodes and the arrangements of the electrochemical cell were identical with those of Example No. 2.

Figure 7:
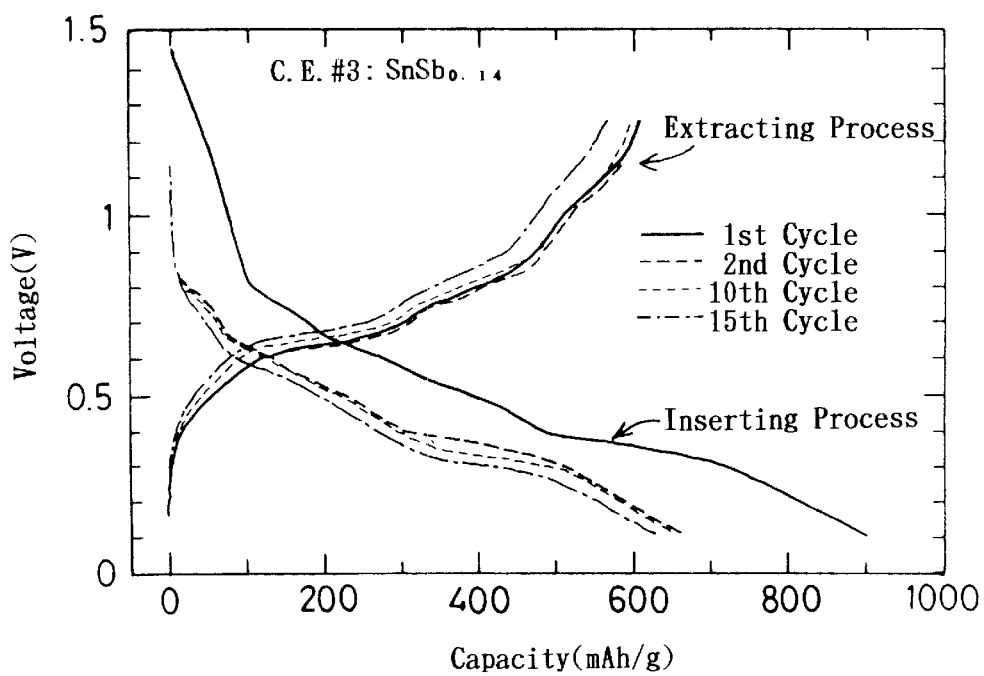
FIG. 7 illustrates the charge-discharge characteristic curves which were exhibited by the electrochemical cell of Comparative Example No. 3 at 1st, 2nd, 10th and 15th cycles.
Figure 8:
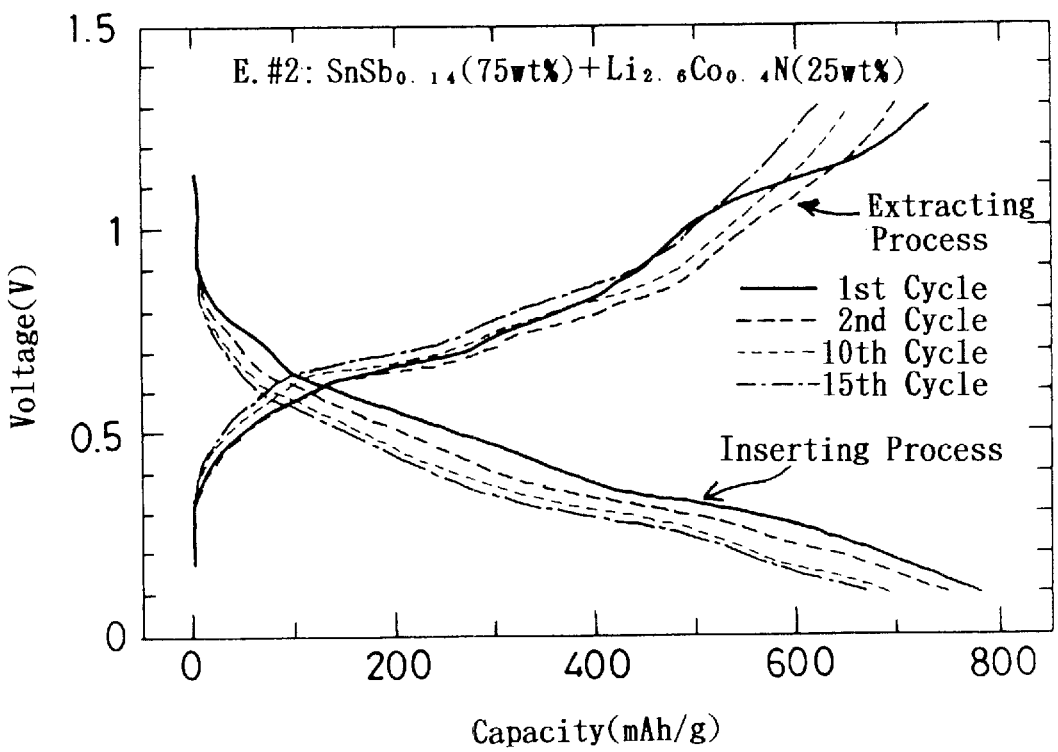
FIG. 8 illustrates the charge-discharge characteristic curves which were exhibited by the electrochemical cell of Example No. 2 at 1st, 2nd, 10th and 15th cycles.
Figure 9:
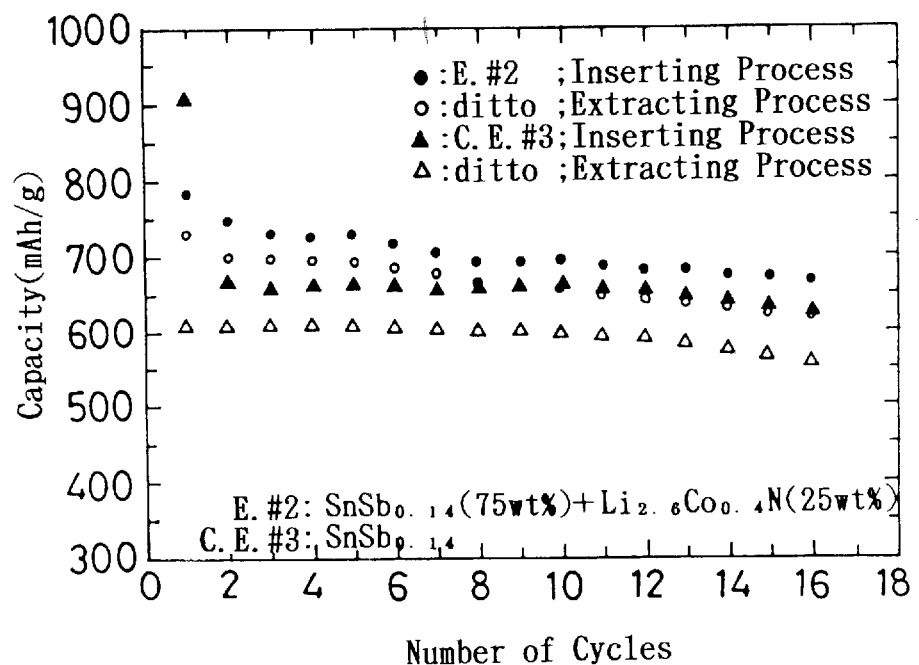
FIG. 9 illustrates the capacities on the inserting process and the capacities on the extracting process which were exhibited by the respective electrochemical cells of Example No. 2 and Comparative Example No. 3 at respective cycles.

The electrochemical cells of Example No. 2 and Comparative Example No. 3 were subjected to the same charge-discharge cycle test under the same conditions as those of Example No. 1. FIGS. 7 through 9 show the following, respectively. FIG. 7 illustrates the charge-discharge characteristic curves, which were exhibited by the electrochemical cell of Comparative Example No. 3 at 1st, 2nd, 10th and 15th cycles. FIG. 8 illustrates the charge-discharge characteristic curves, which were exhibited by the electrochemical cell of Example No. 2 at 1st, 2nd, 10th and 15th cycles. FIG. 9 illustrates the inserting-process capacities and the extracting-process capacities, which were exhibited by the electrochemical cells of Example No. 2 and Comparative Example No. 3 at the respective cycles.

The following are appreciated from the respective diagrams. When the electrochemical cell of Example No. 2 and the electrochemical cell of Comparative Example No. 3 are compared, similarly to Example No. 1 above, the capacity difference was less between the inserting-process and the extracting-process at 1st cycle in the electrochemical cell of Example No. 2, which had the electrode having the composite active material, than in the electrochemical cell of Comparative Example No. 3. Moreover, it is also understood that the electrochemical cell of Example No. 2 had the electrode, which had the small irreversible capacity. Hence, even when the arrangements of the electrode are changed, it is verified that the retention relieving effect can be produced sufficiently.

Note that the electrochemical cell of Example No. 2 exhibited a larger capacity than the electrochemical cell of Example No. 1. This reason is believed as follows. Since the acetylene black serving as the conduction assistant material in Example No. 2 had a smaller density than the Ni powder serving as the conduction assistant material in Example No. 1, the acetylene black was more efficient as the conduction assistant material than the Ni powder serving as the conduction assistant material.

<Example No. 3>

This example was an example, which used an electrode whose mixing rate of the composite active material was different from that of Example No. 1. 65 parts by weight of $SnSb_{0.14}$ serving as the primary active material, and 35 parts by weight of $Li_{2.6}Co_{0.4}N$ serving as the secondary active material were mixed to prepare a composite active material. Similarly to Example No. 1, 80% by weight of this composite active material, 10% by weight of an Ni powder serving as the conduction assistant material, and 10% by weight of polyethylene serving as the bonding agent were compounded to prepare an electrode. Then, an electrochemical cell was prepared by using the electrode in the same manner as Example No. 1, and was labeled as an electrochemical cell of Example No. 3.

Figure 10:
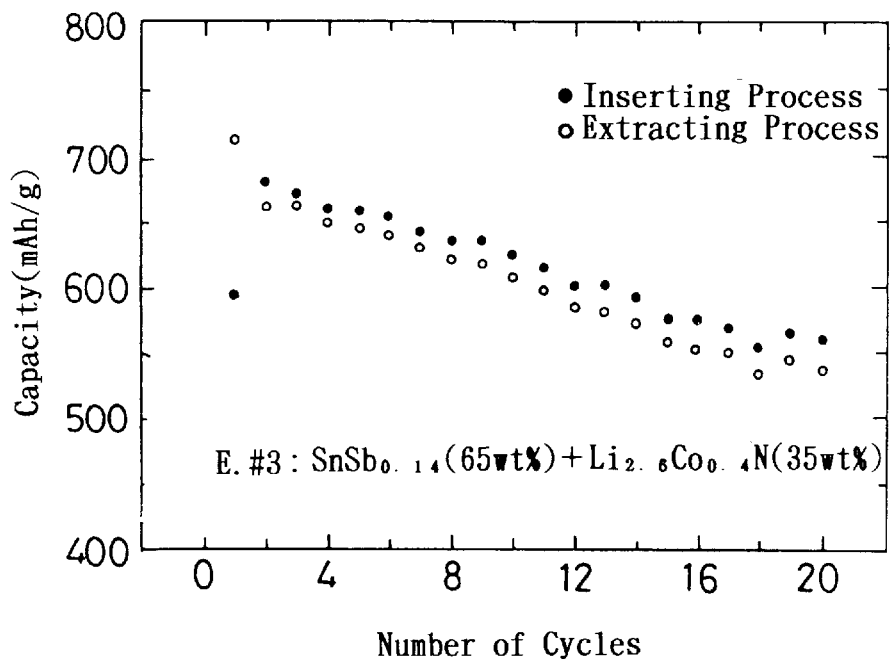
FIG. 10 illustrates the capacities on the inserting process and the capacities on the extracting process which were exhibited by the electrochemical cell of Example No. 3 at respective cycles.

The electrochemical cell of Example No. 3 was subjected to the same charge-discharge cycle test under the same conditions as those of Example No. 1. FIG. 10 illustrates the inserting-process capacities and the extracting-process capacities, which were exhibited by the electrochemical cells of Example No. 3 at the respective cycles.

The following are appreciated by comparing FIG. 4 illustrating the capacities, which were exhibited by the electrochemical cell of Example No. 1 at the respective cycles, with FIG. 10 illustrating the capacities, which were exhibited by the electrochemical cell of Example No. 3 at the respective cycles. The electrochemical cell of Example No. 3 exhibited a smaller capacity in the inserting-process at 2nd cycles than in the inserting-process at 1st cycle. This is believed as follows. The mixing ratio of the $Li_{2.6}Co_{0.4}N$ serving as the secondary active material was increased so that the Li exceeding the irreversible capacity was inserted in the $SnSb_{0.14}$. Hence, in the lithium secondary battery according to the present invention, it is possible to verify that a reasonable range is present in the mixing ratio of the primary active material and the secondary active material.

<Example No. 4>

This example was an example, which employed an electrode using a composite active material, and in which SnO was mixed instead of the Sn—Sb alloy as the primary active material. Two kinds of the composite active material were prepared by mixing SnO and $L_{2.6}Co_{0.4}N$ in a ratio of 65:35 and 60:40 by weight. 80% by weight of the respective composite active materials, an Ni powder serving as the conduction assistant material in an amount of 10% by weight, and polyethylene serving as the bonding agent in an amount of 10% by weight were compounded to prepare 2 electrodes. Then, the respective electrodes were disposed so as to pair with a metallic Li electrode. Whilst, as an aprotic solvent, ethylene carbonate and dimethoxyethane were mixed in a ratio of 1:1 by volume, and $LiPF_6$ was dissolved into the mixture solvent in a concentration of 1 M. Two electrochemical cells were thus constituted. The electrochemical cell, which employed one of the composite active materials and in which SnO was mixed in a mixing ratio of 65% by weight, was labeled as an electrochemical cell of Example No. 4-1. The electrochemical cell, which employed the other one of the composite active materials and in which SnO was mixed in a mixing ratio of 60% by weight, was labeled as an electrochemical cell of Example No. 4-2.

Figure 11:
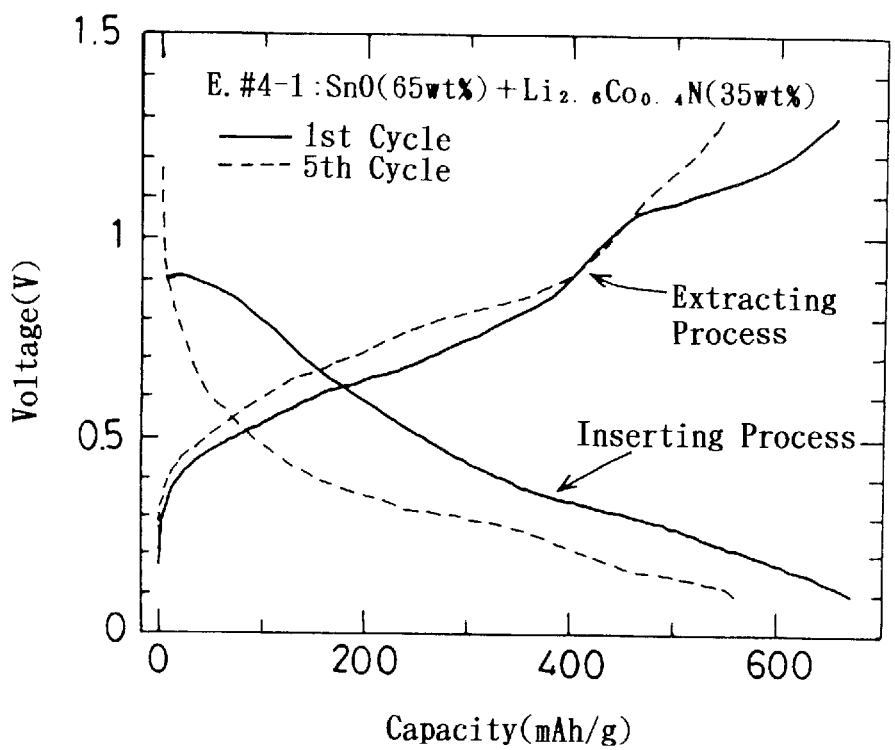
FIG. 11 illustrates the charge-discharge characteristic curves which were exhibited by the electrochemical cell of Example No. 4-1 at 1st and 5th cycles.
Figure 12:
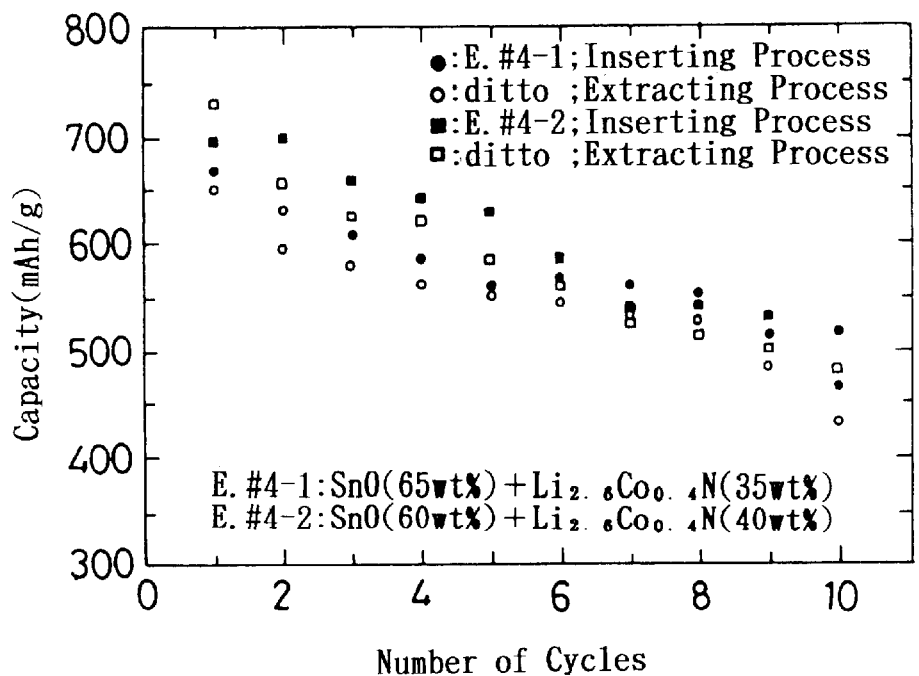
FIG. 12 illustrates the capacities on the inserting process and the capacities on the extracting process which were exhibited by the respective electrochemical cells of Example Nos. 4-1 and 4-2 at respective cycles.

The electrochemical cells of Example No. 4-1 and Example No. 4-2 were saved at room temperature for 10 hours. Due to the voltage difference between SnO and $Li_{2.6}Co_{0.4}N$, the Li contained in the $Li_{2.6}Co_{0.4}N$ was inserted in the SnO. These electrochemical cells were subjected to a charge-discharge cycle test, in which the electrochemical cells were charged and discharged repeatedly at an electric current density of 0.5 $mA/cm^2$, at room temperature and in a voltage difference of from 0.1 to 1.3V. As the results of this test, FIG. 11 illustrates the charge-discharge characteristic curves, which were exhibited by the electrochemical cell of Example No. 4-1 at 1 cycle and 5 cycle. FIG. 12 illustrates the inserting-process capacities and the extracting-process capacities, which were exhibited by the respective electrochemical cells of Example Nos. 4-1 and 4-2 at the respective cycles.

It is apparent from FIGS. 11 and 12 that the capacity difference between the inserting-process capacity and the extracting-process capacity was small at the 1st cycle. When comparing the inserting-process capacity at 1st cycle with the inserting-process capacities at 2nd cycle or more, no substantial change was seen. It is appreciated from this phenomenon that the electrochemical cells of Example Nos. 4-1 and 4-2 had the electrodes which exhibited the small irreversible capacities. Hence, it is possible to verify that, even when the lithium secondary battery according to the present invention employs the Sn oxides, the retention at the negative electrode is relieved efficiently.

<Example No. 5>

This example was an example, which employed a solid polymer electrolyte instead of the organic solvent. 65 parts by weight of $SnSb_{0.14}$ serving as the primary active material, and 35 parts by weight of $Li_{2.6}Co_{0.4}N$ serving as the secondary active material were mixed to prepare a composite active material. An electrode was prepared by compounding this composite active material in an amount of 76% by weight, an Ni powder serving as the conduction assistant material in an amount of 12% by weight, and polyethylene and polyethylene oxide serving as the bonding agent in respective amounts of 7% by weight and 5% by weight. Then, this electrode was disposed so as to face with a metallic Li electrode. Whilst, $LiCF_3SO_3$ was involved in the matrix of the PEO in a concentration of 20% by weight. An electrochemical cell using the solid electrolyte was thus constituted. This electrochemical cell was labeled as an electrochemical cell of Example No. 5.

The electrochemical cell of Example No. 5 was saved at room temperature for 10 hours. Due to the voltage difference between $SnSb_{0.14}$ and $Li_{2.6}Co_{0.4}N$, the Li contained in the $Li_{2.6}Co_{0.4}N$ was inserted in the $SnSb_{0.14}$. This electrochemical cell was subjected to a charge-discharge cycle test, in which the electrochemical cell was charged and discharged repeatedly at an electric current density of 0.1 $mA/cm^2$, at a temperature of 80° C. and in a voltage difference of from 0.1 to 1.3V.

In order to compare with the electrochemical cell of Example No. 5, an electrochemical cell of Comparative Example No. 4 was prepared. In the electrochemical cell of Comparative Example No. 4, an electrode was used in which only the $SnSb_{0.14}$ was served as the active material. The electrochemical cell of Comparative Example No. 4 was subjected to the identical test. Note that, except the active material, the arrangements of the electrode, the arrangements of the electrochemical cell and the conditions of the charge-discharge cycle test were the same as those of Example No. 5. As the results of these tests, FIG. 13 illustrates the charge-discharge characteristic curves, which were exhibited by the respective electrochemical cells of Example No. 5 and Comparative Example No. 4 at 1st cycle.

Figure 13:
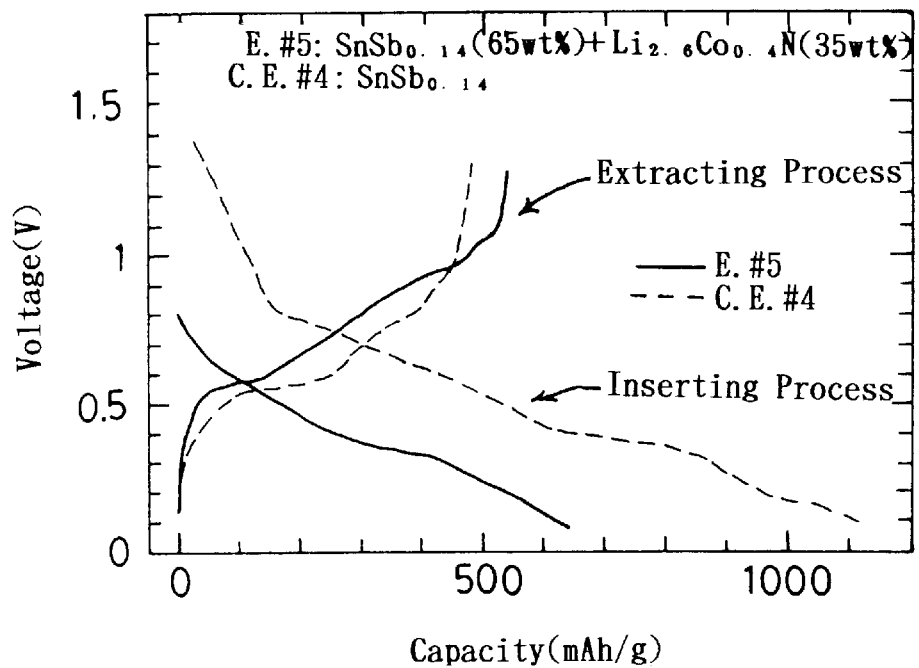
FIG. 13 illustrates the charge-discharge characteristics curves which were exhibited by the respective electrochemical cells of Example No. 5 and Comparative Example No. 4 at 1st cycle.

It is evident from FIG. 13 that the electrochemical cell of Comparative Example No. 4 exhibited a large difference between the inserting-process capacity and the extracting-process capacity, and that a large irreversible capacity was present in the electrochemical cell of Comparative Example No. 4. On the other hand, the electrochemical cell of Example No. 5 employing the composite active material did not show the capacity difference between the inserting-process and the extracting-process substantially, and had the electrode which exhibited a small irreversible capacity. Therefore, even when the present lithium secondary battery is constituted by employing the solid polymer electrolyte, it is possible to verify that the retention which arises at the negative electrode can be relieved efficiently.

Having now fully described the present invention, it will be apparent to one of ordinary skill in the art that many changes and modifications can be made thereto without departing from the spirit or scope of the present invention as set forth herein including the appended claims.

What is claimed is:

1. A lithium secondary battery, wherein a negative electrode active material comprises:
    at least one primary active material selected from the group consisting of Sn, Sn alloys, Sn oxides, Pb, Pb alloys, Si and Si oxides; and
    a secondary active material comprising a lithium nitride expressed by a composition formula, $Li_{3-x}M_xN$, in which "M" is at least one element selected from the group consisting of transition metals and "x" is $0<"x"\leq 0.7$.

2. The lithium secondary battery according to claim 1, wherein said Sn alloy are at least one member selected from the group consisting of Sn—Sb alloys, Sn—Bi alloys and Sn—Pb alloys.

3. The lithium secondary battery according to claim 1, wherein said Sn oxides are at least one member selected from the group consisting of $SnO_2$ and SnO.

4. The lithium secondary battery according to claim 1, wherein said Pb alloys are at least one member selected from the group consisting of Pb—Cd alloys and Pb—Sn alloys.

5. The lithium secondary battery according to claim 1, wherein said Si oxide is SiO.

6. The lithium secondary battery according to claim 1, wherein the transition metals "M" are at least one member selected from the group consisting of Co, Ni and Cu.

7. The lithium secondary battery according to claim 1, wherein the transition metal "M" is Co.

8. The lithium secondary battery according to claim 1, wherein said primary active material is at least one member selected from the group consisting of Sn, Sn alloys and Sn oxides.

9. The lithium secondary battery according to claim 1, wherein said primary active material is an Sn alloy expressed by a composition formula, $SnSb_y$, in which "y" is $0.1\leq"y"\leq 0.35$.

10. The lithium secondary battery according to claim 1, wherein said primary active material is an Sn oxide expressed by a composition formula, SnO.

11. The lithium secondary battery according to claim 1, wherein said lithium nitride is expressed by a composition formula, $Li_{3-x}Co_xN$, in which "x" is $0.3\leq"x"\leq 0.5$.

12. The lithium secondary battery according to claim 1, wherein said primary active material is an Sn alloy expressed by a composition formula, $SnSb_y$, in which "y" is $0.1\leq"y"\leq 0.35$; and
    said secondary active material is lithium nitride expressed by a composition formula, $Li_{3-x}Co_xN$, in which "x" is $0.3\leq"x"\leq 0.5$.

13. The lithium secondary battery according to claim 12, a mixing ratio of said primary active material and said secondary active material is from 80:20 to 60:40 by weight.

14. The lithium secondary battery according to claim 1, wherein said primary active material is an Sn oxide expressed by a composition formula, SnO; and
    said secondary active material is lithium nitride expressed by a composition formula, $Li_{3-x}Co_xN$, in which "x" is $0.3\leq"x"\leq 0.5$.

15. The lithium secondary battery according to claim 1, wherein both of said primary active material and said secondary active material are powdered substances; and
    average particle diameters of both of the primary active material and the secondary active material fall in the range of from 0.1 to 5 $\mu$m.

16. The lithium secondary battery according to claim 15, wherein an average particle diameter of said primary active material and an average particle diameter of said secondary active material are equal substantially.

* * * * *